(12) United States Patent
Egri et al.

(10) Patent No.: US 7,151,476 B2
(45) Date of Patent: Dec. 19, 2006

(54) RADAR SYSTEM HAVING A BEAMLESS EMISSION SIGNATURE

(75) Inventors: Robert Egri, Wayland, MA (US); Dennis Martinez, Westford, MA (US); John Vaughan, Pepperell, MA (US)

(73) Assignee: M/A-COM, Inc., Lowell, MA (US)

( * ) Notice: Subject to any disclaimer, the term of this patent is extended or adjusted under 35 U.S.C. 154(b) by 176 days.

(21) Appl. No.: 10/879,718

(22) Filed: Jun. 28, 2004

(65) Prior Publication Data

US 2006/0255999 A1   Nov. 16, 2006

(51) Int. Cl.
G01S 13/90 (2006.01)

(52) U.S. Cl. .............. 342/25 R; 342/25 A; 342/25 D; 342/25 F; 342/81; 342/108; 342/112; 342/129; 342/145; 342/157; 342/189; 342/103

(58) Field of Classification Search .......... 342/25 R, 342/25 A, 25 D, 25 F, 81, 89, 90, 95–103, 342/108, 112–116, 129–139, 145–147, 154, 342/157, 158, 189, 195–197
See application file for complete search history.

(56) References Cited

U.S. PATENT DOCUMENTS

| | | | | |
|---|---|---|---|---|
| 3,270,340 | A * | 8/1966 | Hammack | 342/103 |
| 3,631,503 | A * | 12/1971 | Tang et al. | 343/754 |
| 3,916,255 | A * | 10/1975 | Crandall | 315/5.24 |
| 4,072,956 | A * | 2/1978 | Provencher | 343/844 |
| 4,583,061 | A * | 4/1986 | O'Shea | 333/116 |
| 5,146,616 | A * | 9/1992 | Tang et al. | 455/103 |
| 5,675,554 | A * | 10/1997 | Cole et al. | 367/138 |
| 5,771,014 | A * | 6/1998 | Shinonaga | 342/140 |
| 6,856,284 | B1 * | 2/2005 | Cangiani | 342/372 |
| 6,933,878 | B1 * | 8/2005 | Molyneux-Berry | 342/16 |
| 7,079,030 | B1 * | 7/2006 | Tsuji | 340/552 |
| 2003/0048223 | A1 | 3/2003 | Kezys | |
| 2005/0232182 | A1 * | 10/2005 | Shattil | 370/319 |
| 2006/0132348 | A1 * | 6/2006 | Valand | 342/13 |
| 2006/0132353 | A1 * | 6/2006 | Natsume et al. | 342/147 |
| 2006/0145914 | A1 * | 7/2006 | Fujikawa et al. | 342/185 |
| 2006/0164293 | A1 * | 7/2006 | Bummerstede | 342/59 |

FOREIGN PATENT DOCUMENTS

JP   06249945 A   *  9/1994

OTHER PUBLICATIONS

"All-round radar", The Engineer London:Feb. 20, 2004, p.P.9.*
"Steered agile beams support for Army Requirements", Proceedings of the SPIE—The International Society for Optical Engineering, 2000, vol. 3952, p. 4-14, Matkin-W.*
"Adaptive digital beamforming (ADBF) architecture for wideband phased—array radars", Proceedings of the SPIE—The International Society for Optical Engineering, 1999, vol. 3704, p. 36-47, Mitchell-M, Howard-R, Tarran-C.*
H. Urkowitz et al., Generalized Resolution in Radar Systems, Proceedings of the IRE, 1962, pp. 2093-2105.
Daniel J. Rabideau and Peter Parker, "Ubiquitous MIMO Multifunction Digital Array Radar," Nov. 2003 IEEE, Signals, Systems and Computers, 2003; pp. 1057-1064.

* cited by examiner

Primary Examiner—John B. Sotomayor

(57) ABSTRACT

A radar system having a beamless emission signature is described. In one implementation, the radar system includes a transmission system and a receiver system. The transmission system is configured to transmit a pattern comprising a plurality of radar signals having different frequencies simultaneously. The receiver system is configured to receive a reflection of the pattern and combine the plurality of radar signals into a composite waveform forming an image of a target.

13 Claims, 6 Drawing Sheets

RADAR SYSTEM HAVING A BEAMLESS EMISSION SIGNATURE

TECHNICAL FIELD

The present invention relates generally to phased array radar systems.

BACKGROUND

In a conventional phased array radar system, all elements of an antenna surface radiate and receive identical radar signals at the same time. There may be an adjusted amplitude and/or phase shift between the radar signals to account for direction of the antennas, but otherwise each active element of the antenna surface transmits and receives the same radar signal (also referred to interchangeably herein as a radar beam). Accordingly, when the radar system is in a transmit mode, a composite signature waveform of the radar beams is susceptible to observation from a hostile observer, making it possible to jam, evade, and/or somehow interfere with the radar system.

SUMMARY

A radar system having a beamless emission signature is described. In one implementation, the radar system includes a transmission system and a receiver system. The transmission system is configured to transmit a pattern including a plurality of radar signals having different frequencies, simultaneously. The receiver system is configured to receive a reflection of the pattern and combine the plurality of radar signals into a composite waveform to form an image of a target.

The following description, therefore, introduces the broad concept of radiating a radar beam (i.e., a pattern) that has no apparent main radar beam by simultaneously transmitting a plurality of radar signals having different frequencies, and forming a virtual radar beam upon receipt of the radar signals by processing the radar signals within the confines of the radar system. Accordingly, at no time is a conventional radar beam emitted, because the plurality of radar signals are emitted at a multitude of different frequencies that appear to a hostile observer to resemble fluctuating and scintillating noise, not only in time but in space coordinates, as well. This makes it extremely difficult for a hostile observer to jam and/or intercept the radar beam generated by the radar system described herein.

BRIEF DESCRIPTION OF THE DRAWINGS

The detailed description is described with reference to the accompanying figures. In the figures, the left-most digit(s) of a reference number identifies the figure in which the reference number first appears.

DETAILED DESCRIPTION

System Overview

Figure 1:
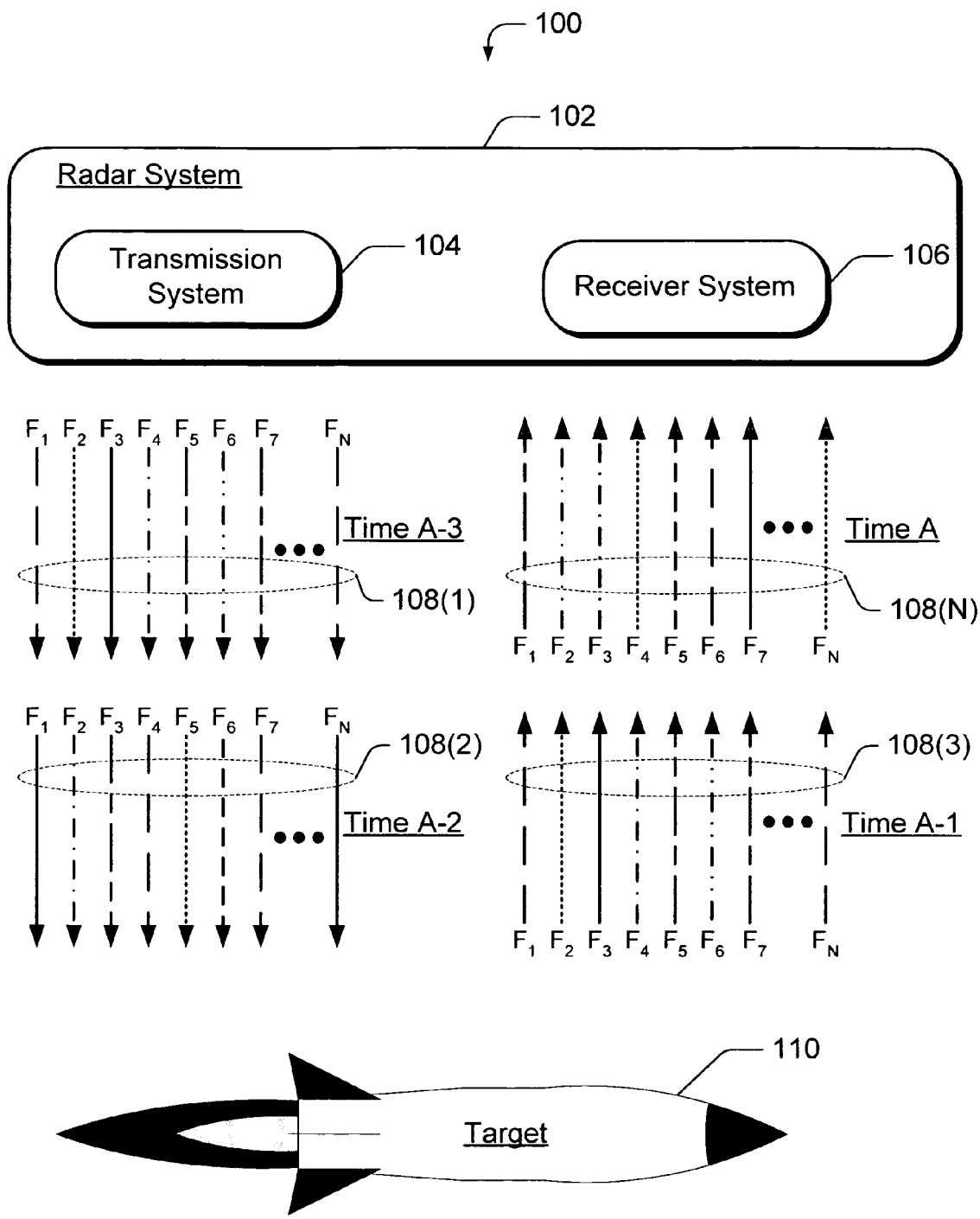
FIG. 1 is a pictorial diagram illustrating select elements used in a system environment in which an exemplary radar system of the present invention may be deployed.

FIG. 1 is a pictorial diagram illustrating select elements used in a system environment 100 in which an exemplary radar system 102 may be deployed. Environment 100 represents a terrestrial, aerial, and/or space-based environment in which radar system 102 may observe objects on the ground and/or in the atmosphere for military and/or civilian applications.

In one implementation, it is expected that radar system 102 will be used in a very large aperture radar system. For example, radar system 102 may be implemented on a platform, approximately the size of a United States football field, flown in a low earth space-based orbit. Such a massive system may have more than 4,500 antennas (also referred to herein as radiators) used for transmitting and receiving radar signals (described beginning with reference to FIG. 3). Of course, this is only one example of the type of platform on which radar system 102 may be deployed, and it is possible for the size, type, and number of antennas to vary.

Continuing to refer to FIG. 1, radar system 102 generally includes a transmission system 104 and a receiver system 106 that rely on an array of antennas (not shown in FIG. 1) to transmit and receive radar signals. For instance, transmission system 104 is configured to transmit patterns 108(1), 108(2), 108(3), . . . , 108(N). A pattern, referred to generally as reference number 108, comprises a plurality of radar signals $F_1, F_2, F_3, F_4, F_5, F_6, F_7, \ldots, F_N$ transmitted simultaneously in any given period of time (e.g., Time (A), Time (A-1), Time (A-2), Time (A-3), and so forth). Each radar signal, referred to generally as $F_x$, represents an electromagnetic waveform that generally has a unique frequency component when compared to other radar signals in the same pattern. In other words, each radar signal $F_x$ of pattern 108 generally has its own unique frequency. It is also possible, however, that some of the radar signals $F_1, F_2, F_3, F_4, F_5, F_6, F_7, \ldots, F_N$ in any particular pattern may have identical frequency waveforms. For example, in pattern 108(1), radar signal $F_1$ and radar signal $F_3$ may have identical waveforms, while the rest of the radar signals, $F_2, F_4, F_5, F_6, F_7, \ldots, F_N$, of pattern 108(1) may have different (i.e., unique) waveforms.

Transmission system 104 is capable of transmitting the same pattern each period of time or may vary the pattern by altering the radiated waveforms associated with each radar signal over time. By permuting the frequencies associated with radar signals from pulse-to-pulse (e.g., Time (A)-to-Time (A- 1), etc.), each successive pattern 108(1), 108(2), . . . 108(N) should appear to a hostile observer to resemble fluctuating and scintillating noise. Accordingly, at no time is there an emission of a conventional radar beam from radar system 102. This makes it extremely difficult for the hostile observer to intercept and jam radar system 102. In this fashion, radar system 102 is able to transmit radar signals stealthily and without an identifiable main radar beam that is referred to as a "beamless emission signature."

Receiver system 106 is configured to receive a reflection of each of the patterns 108 reflected from a target 110. With each received pattern 108, receiver system 106 is further configured to combine the radar signals $F_1, F_2, F_3, F_4, F_5, F_6, F_7, \ldots, F_N$ of each pattern 108 to form a composite aggregate waveform representing an image of target 110.

Figure 2:
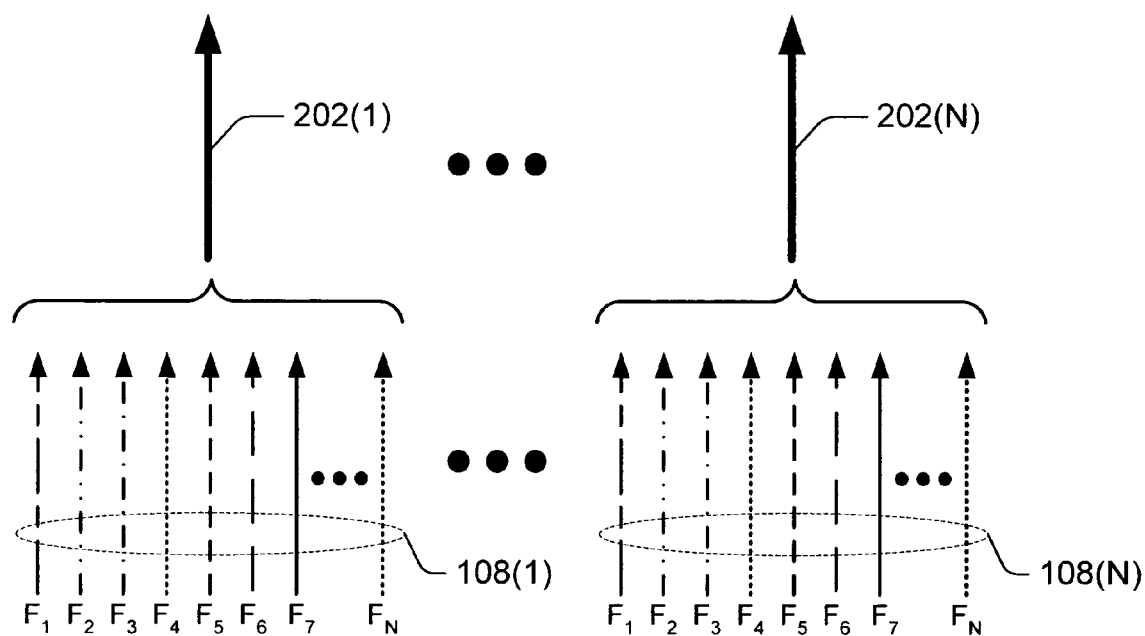
FIG. 2 illustrates waveforms of virtual radar beams (i.e., synthetic radar beams) of the present invention formed by combining the radar signals of patterns.

For example, FIG. 2 illustrates waveforms 202(1) and 202(N) that are virtual radar beams (i.e., synthetic radar beams) formed by combining each of the radar signals of patterns 108(1) and 108(N), respectively. In other words, receiver system 106 receives reflected patterns 108(1) and 108(N) from a target 110 (FIG. 1) and converts each pattern into a waveform 202(1) and 202(N), respectively, representing a virtual radar beam. Accordingly, radar system 102 (FIG. 1) is able to form an image of a target 110 (FIG. 1) by processing each of the waveforms 202. By forming a virtual radar beam within the confines of radar system 102 (FIG. 1), it is possible to avoid transmitting and receiving a conventional main radar beam with physical properties that are observable.

Figure 3:
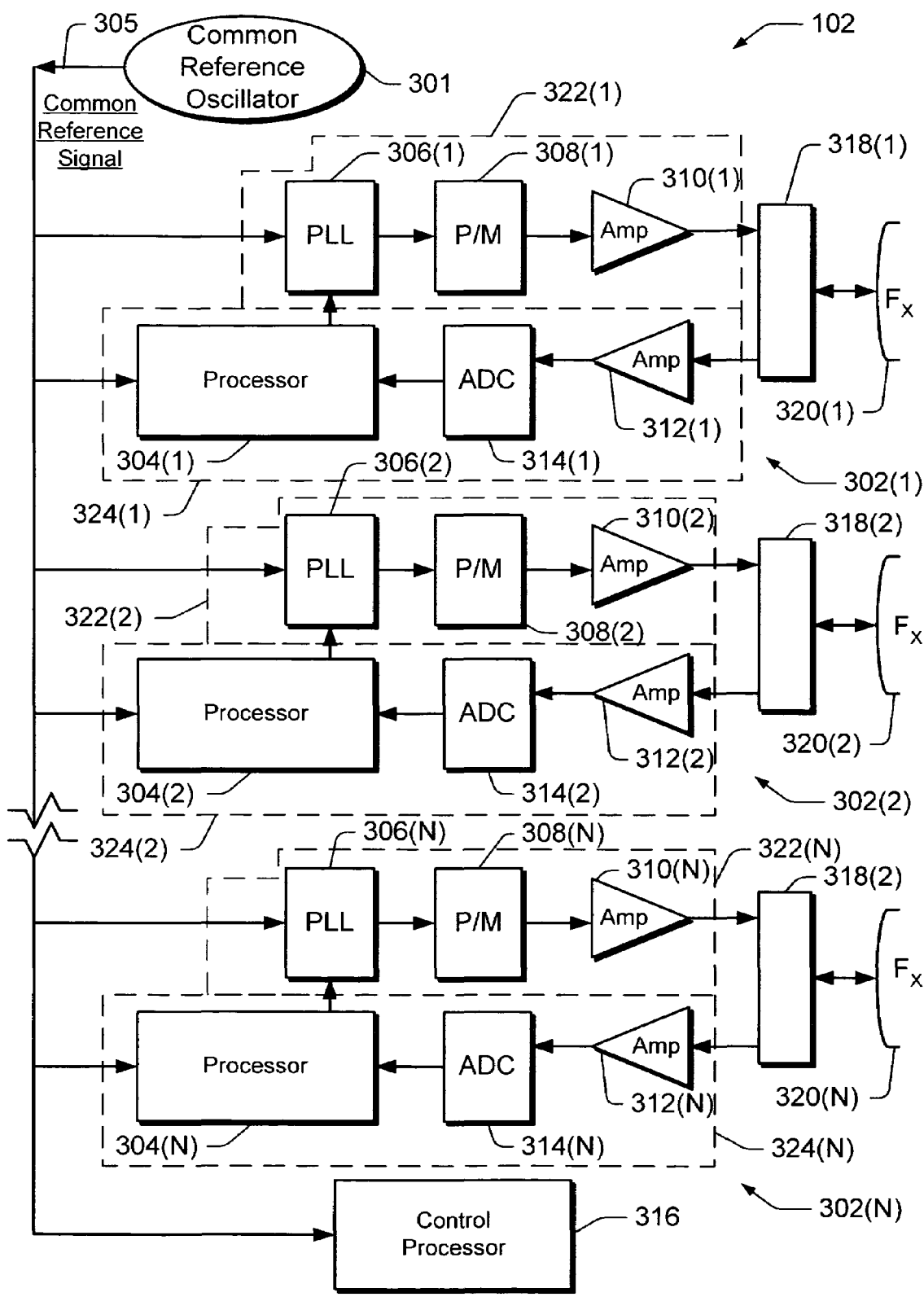
FIG. 3 is a block diagram illustrating various components of an exemplary implementation for a radar system that can be utilized to implement the inventive techniques described herein.

FIG. 3 is a block diagram illustrating various components of an exemplary implementation for radar system 102 that can be utilized to implement the inventive techniques described herein. Radar system 102 includes, a common reference oscillator 301, transmit/receive (T/R) elements 302(1), 302(2), ..., 302(N), with their signal processing 304(1), 304(2), ..., 304(N), and control processor 316.

Common reference oscillator 301 is a fixed oscillator circuit or a variable oscillator, such as a voltage controlled oscillator (VCO). Common reference oscillator 301 is used to create a particular reference signal 305 that serves as a common unmodulated pilot signal for T/R elements, referred to generally as reference number 302. In the exemplary implementation, common reference oscillator 301 relies on one or more crystals (not shown) to generate the reference signal 305.

Figure 4:
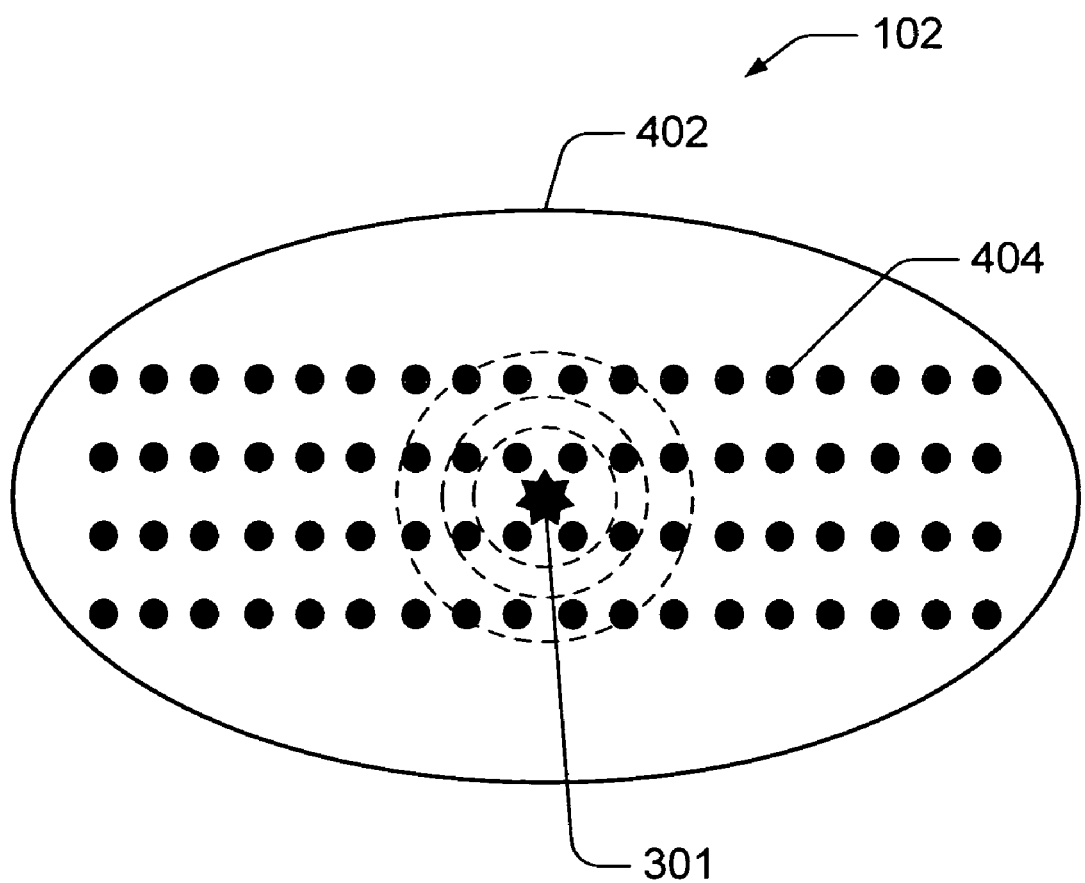
FIG. 4 shows an antenna surface of a radar system of the present invention.

Common reference signal 305 can be distributed from common reference oscillator 301 via a coaxial cable or a microstrip line. Alternatively, common reference oscillator 301 may be positioned in the middle of an array of antenna elements and distribute a low power (e.g., 1 mW) signal. For example, FIG. 4 shows an antenna surface 402 representing a substrate or base supporting a plurality of antennas of a radar system 102. In particular, antenna surface 402 includes radiators 404, and the common reference oscillator 301 located in the middle. Each of the radiators 404 are individually phased locked to the common reference oscillator 301 that generates an unmodulated reference pilot and thus the radiators 404 (via their constituent elements, such as T/R elements 302 and signal processors 304, etc.), are kept phase coherent with each other.

Referring to FIG. 3, T/R elements 302 are separate radar units operating collectively as a phased array radar system. In one exemplary implementation, each T/R element 302 includes a transmission unit 322 and a receiver unit 324. In particular, each of the transmission units 322 generally includes a phase locked loop (PLL) 306, a phase and amplitude modulator 308, and a transmit amplifier 310. Each of the receiver units 324 generally includes a processor 304, a receive amplifier 312, and an analogue-to-digital converter (ADC) 314. Both transmission units 322 and receiver units 324 also generally utilize an antenna duplexer 318, and a radiator 320.

PLLs 306 generally include a local radio frequency (RF) oscillator not shown, but which is readily understood by those skilled in the art. PLLs 306 assist in creating a particular carrier frequency for signals to be transmitted by each radiator 320. In the exemplary implementation, each PLL 306 is phase-locked to reference signal 305. Alternatively, a direct digital synthesizer (not shown) with a combination of an upconverter/fixed frequency oscillator (not shown) can also be employed.

Phase and amplitude modulators 308 vary the phase and amplitude of signals generated by PLLs 306. Alternatively, phase modulators can also be incorporated within the phase locked loops 306, or completely arbitrarily modulated waveforms can be generated by direct digital synthesis. Transmit amplifiers 310 amplify signals produced by PLLs 306 and phase shifters 308 for transmission by each antenna 320. Antenna duplexers 318 enable signals to be sent and received by a radiator 320. For a pulse radar system, antenna duplexers 318 can be implemented as a transmit/receive switch. Alternatively, antenna duplexers 318 can be implemented as circulator or other type of antenna switch configuration.

Radiators 320 are used as a conduit for receiving and/or transmitting signals. Some radar systems may use more than one radiator per T/R element 302 for transmitting or receiving signals. For purposes, of this discussion, it should be appreciated that radiator 320 is identical to radiators 404 shown in FIG. 4, albeit shown in more detail with reference to T/R elements 302 in FIG. 3. It is understood that each physical radiator 320/404 (FIGS. 3/4), is driven by electronic elements such as T/R elements 302, etc. It should also be recognized that radiators 320 come in a variety of forms, and for purposes of this discussion any of these variety of forms may be included.

Referring to FIG. 3, receive amplifiers 312 amplify signals received by a radiator 320 and transmit the amplified signals to ADCs 314 for conversion to a digital domain. It should be recognized that amplifiers and ADCs come in a variety of configurations, and for purposes of this discussion any of these variety of configurations may be included.

Processors 304 execute various instructions to control the operation of each T/R element 302 and to communicate with a control processor 316. In one implementation, processors 304 and control processor 316 are implemented as digital signal processors. In other implementations, processors may be implemented as self-executing programmable logic arrays in the form of a FPGA (Field Programmable Gate Array), microprocessors, one or more ASICs (Application Specific Integrated Circuit), or other hardware-based technology including hybrid circuit and programmable logic technologies. It is also to be appreciated that the components and processes described herein can be implemented in software, firmware, hardware, or combinations thereof. By way of example, a DSP, programmable logic device (PLD) or ASIC could be configured or designed to implement various components and/or processes discussed herein.

Processors 304 generally rely on control processor 316 for housekeeping operations, such as initializing radar system 102, handling error conditions, and other duties that generally fall outside the scope of each respective processor 304.

Those skilled in the art will recognize that there are many different types of transmission units 322 and receiver units 324, and that for the purposes of this discussion, most receivers and transmitters may include any of these different types. It is to be appreciated that additional components can be included in each T/R element 302 and some components illustrated in each T/R element 302 above need not be included. For example, additional processors 304 may be included in a T/R element 302, or phase and amplitude modulators 308 may not be included.

Having introduced various components of radar system 102, it is now possible to describe its relevant operation in more detail with reference to FIG. 3.

Each T/R element 302 is configured to transmit a radar signal with a frequency $F_x$ that is generally unique to the particular antenna element. Each T/R element 302 is configured to receive a conglomeration of the radar signals $F_1$, $F_2$, $F_3$, $F_4$, $F_5$, $F_6$, $F_7$, ..., $F_N$ (FIG. 1) reflected from a target 110 (FIG. 1), including the particular radar signal with a frequency $F_x$ unique to the particular antenna element.

For example, suppose at a time period A, T/R element 302(1) transmits a radar signal (via one or more radiators 320) associated with a particular pattern having a frequency of $F_3$, T/R element 302(2) transmits a radar signal (associated with the same pattern) having a frequency of $F_5$, and T/R element 302(N) transmits a radar signal with a frequency of $F_1$. At a period of time later (such as double the transmit time) T/R elements 302(1), 302(2), ..., 302(N) will receive (via radiators 320) a conglomeration of the radar signals $F_1$, $F_2$, $F_3$, $F_4$, $F_5$, $F_6$, $F_7$, ..., $F_N$ reflected form the target 110 (FIG. 1) in the form of a pattern 108 (FIG. 1), including the frequency that is unique to the particular antenna element: i.e., in this example, radar signal $F_3$ is unique to T/R element 302(1); radar signal $F_5$ is unique to T/R element 302(2); and radar signal $F_1$ is unique to T/R element 302(N).

Each receive processor 304, is configured to correlate the composite reflected radar signal that was generated locally by the particular T/R element 302. For instance, processor 304(1) is configured to determine which of the radar signals $F_1$, $F_2$, $F_3$, $F_4$, $F_5$, $F_6$, $F_7$, ..., $F_N$ reflected from the target was locally generated by T/R element 302(1). Likewise, processor 304(2) is configured to recognize which of the radar signals $F_1$, $F_2$, $F_3$, $F_4$, $F_5$, $F_6$, $F_7$, ..., $F_N$ reflected form the target was locally generated by T/R element 302(2), and so forth.

Based on each of the locally recognized radar signals by processors 304, control processor 316 is able to correlate the radar signals to the T/R elements 302 that transmitted the radar signals, and combine the radar signals to form an image of the target 110 (FIG. 1). Accordingly, processor 304 and control processor 316 act as processing system enabling a reflected composite signal to be demodulated, or correlated, at each T/R element 302, and combined. This coherent correlation over time enables processing system 304/316 to form a synthetic and spatially selective antenna beam.

Having introduced radar system 102, it is now possible to describe its features, analytical details, and operation in more detail.

Theoretical and Analytical Details

In a conventional "static" phased array, all elements of the antenna surface radiate the same time waveform except for its amplitude and phase. The appropriate setting of these amplitudes and phases will form an antenna radiation pattern whose shape is independent of the time evolution of the waveform as long as the latter is "narrowband", that is, its bandwidth is much less than the carrier frequency. At any given time, the radiation pattern is the Fourier transform of the aperture distribution. In synthetic aperture radar, where a single radiator is moved to cover an effective antenna surface while the waveforms radiated at different points and instances are identical from pulse to pulse, the situation is similar. Because of the complete linearity and time invariance of electromagnetic wave radiation and propagation a particular waveform can be processed by sampling it at various times, frequencies and locations. As long as all relevant samples are "covered" a coherent receiver should be able to reconstruct the image.

In contrast to a conventional synthetic aperture radar, radar system 102 decomposes the desired time waveform into its frequency components, then transmits each frequency component from one or several T/R elements 302 (FIG. 3).

Upon reflection, the received waveform will contain the composite of all the transmitted frequencies. While there is a single reflected waveform, the individual radiators 320 will receive one a signal whose phase varies with the element's location. Since at any given time radiators 320 generally transmit at different frequencies, in the conventional sense there is no "real" beam being formed during transmission of the radar pulse. In other words, the resulting interference pattern is not static but fluctuates at the envelope rate of the composite waveform, but upon coherently processing the reflected waveform, a synthetic antenna radiation pattern is being formed when the phases of the received signal are properly aligned.

Figure 5:
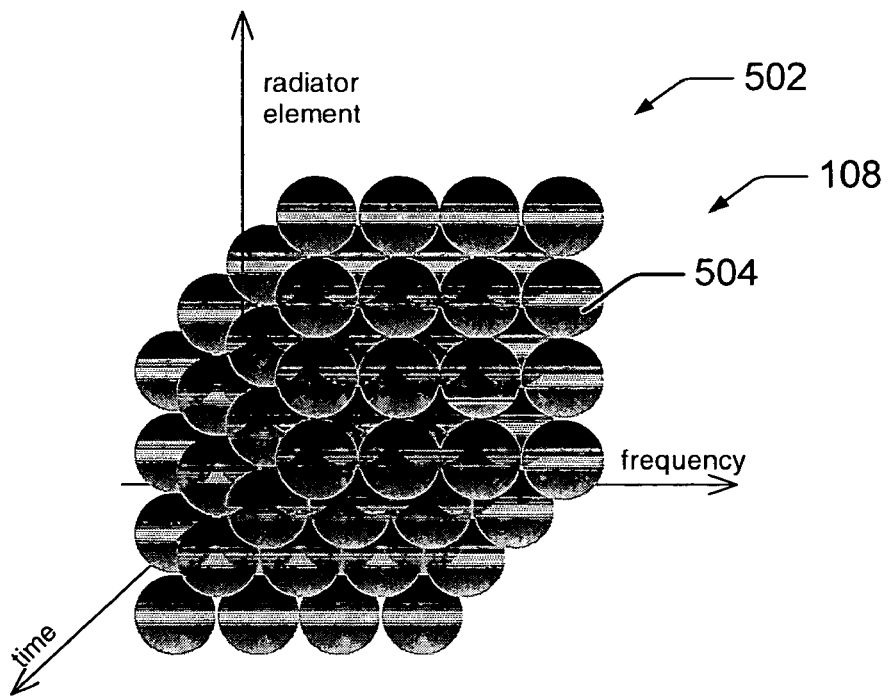
FIG. 5 shows a three-dimensional graph showing the nature of a pattern emitted as a waveform from a radar system of the present invention.

FIG. 5 shows the three-dimensional nature of a pattern 108 emitted as a waveform 502 from radar system 102. Waveform 502 includes a frequency dimension, a time dimension, and a radiating element index dimension. Each sphere 504 represents an elementary waveform, i.e., a pulse at a particular frequency, as transmitted by a radiator 320 (also referred to as a radiating element).

Figure 6:
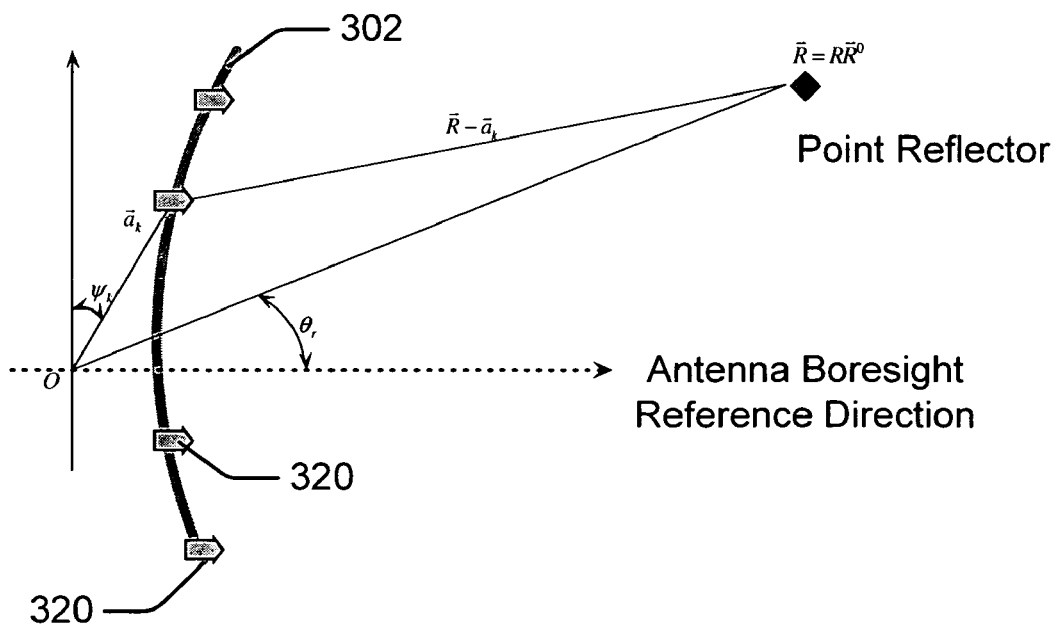
FIG. 6 shows an exemplary antenna and its reflector geometry as used in the present invention.

FIG. 6 shows an exemplary antenna surface 402 and element 320 and a point reflector. For purposes of discussion, assume that radiator 320 (FIG. 6) is referred to as radiating element k. Also assume that k is located on the antenna surface 402 at a point $\overline{\alpha}_k$ and a pulse of length $T_p$ is transmitted with phase $\sigma_k$, amplitude $A_k$ and frequency $u_k$. The particular phase shifter settings $\sigma_k$ control the antenna scanning, i.e., focusing or collimating. The antenna surface 402 of an antenna does not have to be flat, thus the concept applies to so-called conformal antennas, as well.

In complex envelope notation, the composite pulse transmitted by the antenna in the far field is proportional to:

$$E(\vec{R}, t) \propto \sum_k A_k e^{i\sigma_k} \text{rect}\left(\frac{t - \tau'_k}{T_p}\right) e^{i2\pi u_k(t - \tau'_k)} \quad (0.1)$$

where the summation runs over the antenna elements indexed by k;

$$\tau'_k = \frac{|\vec{R} - \vec{a}_k|}{c}$$

is the time it takes for the EM wave to reach the reflector located at point $\vec{R}$ when it is launched from the radiator at $\overline{\alpha}_k$ and we define the rectangular pulse as rect $$(t) = 1 \text{ for } |t| < \frac{1}{2}$$

and 0 otherwise.

Denoted by θ, an arbitrary off-boresight angle and by $\psi_k$ the angle of the $k^{th}$ radiator. (If the antenna surface is flat and the origin of coordinate system is on it then the angles, then $\psi_k=0$ or $\pi$.) Far from the antenna, in the far field we have the approximation $$\tau'_k = \frac{1}{c}\sqrt{R^2 + a_k^2 - 2\vec{R}\cdot\vec{a}_k} \approx \frac{R}{c}\left(1 - \frac{1}{R}\vec{R}^0\cdot\vec{a}_k\right) = \tau' - \frac{a_k}{c}\sin(\theta - \psi_k) \quad (0.2)$$

$$\tau' = \frac{R}{c}$$

being the effective one-way delay. The aggregate field at a given point of space $\vec{R}(\tau',\theta)$ represented by the delay $\tau'$ and off-boresight direction $\theta$ is $$E(\vec{R},t) \propto \sum_k A_k e^{i\sigma_k} rect\left(\frac{t-\tau'_k}{T_p}\right)e^{i2\pi u_k(t-\tau'_k)} \approx$$

$$\sum_k A_k e^{i\sigma_k} rect\left(\frac{t-\tau'_k}{T_p}\right)\exp\left[i2\pi u_k\left(t-\tau'+\frac{a_k}{c}\sin(\theta-\psi_k)\right)\right]$$

and thus $$E(\vec{R}(\tau',\theta),t) \propto \quad (0.3)$$

$$rect\left(\frac{t-\tau'_k}{T_p}\right)\sum_k A_k e^{i\sigma_k} e^{i2\pi u_k(t-\tau')}\exp\left[i2\pi u_k \frac{a_k}{c}\sin(\theta-\psi_k)\right]$$

The last approximation step follows because the rectangular pulse rect $$\left(\frac{t}{T_p}\right)$$

is much longer than any variation in $\tau'_k$ over the antenna surface:

$$rect\left(\frac{t-\tau'_k}{T_p}\right) \approx rect\left(\frac{t-\tau'}{T_p}\right).$$

Assume that a point reflector is located at $\vec{R}(\tau',\theta_r)$:

$$E(\vec{R}(\tau',\theta_r),t) \propto \quad (0.4)$$

$$rect\left(\frac{t-\tau'}{T_p}\right)\sum_k A_k e^{i\alpha_k} e^{i2\pi u_k(t-\tau')}\exp\left[i2\pi u_k\frac{a_k}{c}\sin(\theta_r-\psi_k)\right]$$

If the phase shifters are set so that $$\sigma_k \equiv -2\pi u_k \frac{a_k}{c}\sin(\theta_r-\psi_k)\mod 2\pi \quad (0.5)$$

Then $$e^{i\sigma_k}\exp\left[i2\pi u_k\frac{a_k}{c}\sin(\theta_r-\psi_k)\right] = 1$$

independently of the target range, and from (0.4) for the wave amplitude is obtained in the "focused" or collimated direction $$E(\vec{R}(\tau',\theta_r),t) \propto \sum_k A_k rect\left(\frac{t-\tau'_k}{T_p}\right)e^{i2\pi u_k(t-\tau')} \approx \quad (0.6)$$

$$rect\left(\frac{t-\tau'}{T_p}\right)\sum_k A_k e^{i2\pi u_k(t-\tau')},$$

that is the time delayed version of rect $$\left(\frac{t}{T_p}\right)\sum_k A_k e^{i2\pi u_k t}$$

the latter being the desired composite radar signal.

The appropriate setting $\sigma_k$ for each phase shifter depends, of course, on the desired off-boresight angle $\theta_r$. In the simplest case, when the antenna surface is flat, $\sin\psi_k=0$, and the radiators are uniformly spaced, $\alpha_k=kd$, one obtains $$\sigma_k \equiv -2\pi\frac{kd}{\lambda_k}$$

$\sin\theta_r$, a standard result for beam steering when all the frequencies $u_k=c/\lambda_k$ are also set to be the same.

Radiation Pattern

For any given setting of the phase shifters and amplitudes the field $E(\vec{R}(\tau',\theta),t)$ in an arbitrary direction is given by (0.3).

When the phase shifters are set to collimate the beam in the direction represented by the off-boresight angle $\theta_r$, where $$\sigma_k \equiv -2\pi u_k\frac{a_k}{c}\sin(\theta_r-\psi_k)\mod 2\pi, \quad (0.5)$$

$\sin(\theta_r-\psi_k)\mod 2\pi(0.5)$, and the field $E(\vec{R}(\tau',\theta),t)$ in any other arbitrary direction $\theta$, is determined as follows:

$$E(\vec{R}(\tau',\theta),t) \propto$$

$$rect\left(\frac{t-\tau'}{T_p}\right)\sum_k A_k e^{i\sigma_k} e^{i2\pi u_k(t-\tau')}\exp\left[i2\pi u_k\frac{a_k}{c}\sin(\theta-\psi_k)\right] =$$

$$rect\left(\frac{t-\tau'}{T_p}\right)\sum_k A_k e^{i2\pi u_k(t-\tau')}\exp\left[i2\pi u_k\frac{a_k}{c}(\sin(\theta-\psi_k)-\sin(\theta_r-\psi_k))\right]$$

or $$E(\vec{R}(\tau', \theta), t) \propto \qquad (1.1)$$

$$rect\left(\frac{t-\tau'}{T_p}\right)\sum_k A_k e^{i2\pi u_k(t-\tau')}e^{i2\pi u_k \frac{a_k}{c} 2\sin\left(\frac{1}{2}(\theta-\theta_r)\right)\cos\left(\frac{1}{2}(\theta+\theta_r)+\psi_k\right)}$$

When $\theta \approx \theta_r$, the approximation is $$E(\vec{R}(\tau', \theta), t) \propto$$

$$rect\left(\frac{t-\tau'}{T_p}\right)\sum_k A_k e^{i2\pi u_k(t-\tau')}\left(1+i2\pi u_k \frac{a_k}{c}\cos(\theta_r + \psi_k)(\theta - \theta_r)\right)$$

$$E(\vec{R}(\tau', \theta), t) - E(\vec{R}(\tau', \theta), t) \propto$$

$$(\theta - \theta_r)rect\left(\frac{t-\tau'}{T_p}\right)\sum_k A_k e^{i2\pi u_k(t-\tau')}i2\pi u_k \frac{a_k}{c}\cos(\theta_r + \psi_k)$$

That is, the field intensity is nearly linear function of the angle for small deviation from the nominal boresight.

If this were conventional radar, then the radiation pattern $E(\vec{R}(\tau',\theta),t)$ would be proportional to the transmitted pulse rect $$\left(\frac{t-\tau'}{T_p}\right)e^{i\pi u(t-\tau')},$$

where the shape of the proportionality factor $F(\theta)$ would depend only on the locations of the radiating elements, as defined by $$F(\theta) = \sum_k e^{i2\pi u \frac{a_k}{c} 2\sin\left(\frac{1}{2}(\theta-\theta_r)\right)\cos\left(\frac{1}{2}(\theta+\theta_r)+\psi_k\right)}$$

with $|F(\theta)|^2$ being the antenna directivity.

Since in (1.1) such factorization is impossible, there is no transmit antenna pattern in a conventional sense. Instead the pattern will be varying with time, and fluctuate.

Received Wave from the Collimated Direction

Upon reflection from the point target at $\vec{R}$, the received field at T/R element 302 m will be proportional to, see (0.6):

$$E_m(\vec{R}, t) \propto E(\vec{R}, t - \tau'_m) \approx rect\left(\frac{t-\tau'-\tau'_m}{T_p}\right)\sum_k A_k e^{i2\pi u_k(t-\tau'_m)} \qquad (2.1)$$

Notice that this signal contains all the transmitted frequencies. To receive it optimally, one must, therefore, correlate it with its locally regenerated complex conjugate $\bar{E}_m(\vec{R},t)$ and then sum the resulting correlations over the several receivers.

$$\tau'_m \approx \tau' - \frac{a_m}{c}\sin(\theta_r - \psi_m) = \tau' - \delta\tau_m,$$

is a delay dependent on the radiating element and on the beam direction, but is independent of the target range, $2\pi u_m \delta\tau_m \equiv -\alpha_m \mod 2\pi$. Denoting the nominal roundtrip propagation delay between the radar and the target by $\tau=2\tau'$, the received field intensity at receiver m is proportional to:

$$E_m(\vec{R}, t) \propto E(\vec{R}, t - \tau'_m) \propto rect\left(\frac{t-\tau'-\tau'_m}{T_p}\right)\sum_k A_k e^{i2\pi u_k(t-\tau'-\tau'_m)} \approx$$

$$rect\left(\frac{t-2\tau'}{T_p}\right)\sum_k A_k e^{i2\pi u_k(t-\tau'-\tau'+\delta\tau_m)} =$$

$$rect\left(\frac{t-\tau}{T_p}\right)\sum_k A_k e^{i2\pi u_k \delta\tau_m} e^{i2\pi u_k(t-\tau)} = V_m(t-\tau)$$

That is:

$$E_m(\vec{R},t) \propto V_m(t-\tau) \qquad (2.2)$$

Besides being dependent both on the transmitted frequencies and on the receiving module m, the time function $$V_m(t) = rect\left(\frac{t}{T_p}\right)\sum_k A_k e^{i2\pi u_k \delta\tau_m} e^{i2\pi u_k t} \qquad (2.3)$$

through the relationship $$\frac{a_m}{c}\sin(\theta_r - \psi_m) = \delta\tau_m,$$

also depends implicitly on the direction the beam is being collimated but does not depend on the range delay $\tau$.

Next, the correlation is calculated $$K_m(s) =$$
$$\frac{1}{T_p}\int_{-\infty}^{\infty} E_m(\vec{R}, t')\bar{E}_m(\vec{R}, s+\tau+t')dt' = \frac{1}{T_p}\int_{-\infty}^{\infty} E_m(\vec{R}, t')\bar{V}_m(s+t')dt'$$

Here the appearance of $s=t-\tau$ in the argument of $V_m$ signifies that the range gate of the radar receiver is centered around the epoch $\tau$, i.e., the "running time" is $t=s+\tau$.

$$K_m(t) = \frac{1}{T_p} \int_{-\infty}^{\infty} E_m(\vec{R}, t') \overline{V}_m(t - \tau + t') dt' \approx \begin{bmatrix} \sum_k |A_k|^2 e^{-i2\pi u_k t} \frac{1}{T_p} \int_{\frac{T_p}{2}+\tau}^{\frac{T_p}{2}+\tau} rect\left(\frac{t+t'-\tau}{T_p}\right) dt' + \\ \sum_{\substack{k,k' \\ k \neq k'}} A_k \overline{A}_{k'} e^{-i2\pi(u_k - u_{k'})(\tau - \delta\tau_m)} \frac{1}{T_p} \int_{\frac{T_p}{2}+\tau}^{\frac{T_p}{2}+\tau} rect\left(\frac{t+t'-\tau}{T_p}\right) e^{i2\pi u_k t'} e^{-i2\pi u_{k'}(t+t')} dt' \end{bmatrix} \quad (2.4)$$

This formula contains simple integrals that can be evaluated by an appropriate change of variable.

Therefore, $$K_m(t) \approx \sum_k |A_k|^2 e^{-i2\pi u_k t} tria\left(\frac{t}{T_p}\right) + \text{cross terms } (k, k')$$

By referencing the time to the instant the pulse echo arrives at the antenna we have shifted the argument of the correlation function by $\tau$. The epoch t=0 is thus especially important, for it represents the center of the range gate, that is, the moment of peak detection:

$$K_m(0) \approx \sum_k |A_k|^2 + \text{cross terms } (k, k').$$

cross terms (k,k'). At t=0 the double sum of the cross terms also simplifies to:

$$\sum_{\substack{k,k' \\ k \neq k'}} A_k \overline{A}_{k'} e^{i2\pi(u_k - u_{k'})\delta\tau_m} sinc((u_k - u_{k'})T_p)$$

Notice that to collimate the receive beam during receive processing, it is not necessary to have to employ a pair of attenuation and phase shifter settings, $A_m'$ and $\alpha_m'$ explicitly. In fact, this gains nothing because those beam parameters were implicitly part of the construction of the locally regenerated composite signal $$V_m(t) = rect\left(\frac{t}{T_p}\right) \sum_k A_k e^{i2\pi u_k \delta\tau_m} e^{i2\pi u_k t}$$

with which is correlated the reflected wave.

The final compressed signal is the sum over the M(m=1,2, ..., M) receivers of their individual "partial" correlations:

$$z(t) = \sum_m K_m(t) \approx \sum_m \left\{ \sum_k |A_k|^2 e^{-i2\pi u_k t} tria\left(\frac{t}{T_p}\right) + \text{cross terms } (k, k') \right\}$$

When t=0

$$z(0) = M \sum_k |A_k|^2 + \sum_{k'} \sum_{\substack{k \\ k \neq k'}} \left\{ A_k \overline{A}_{k'} sinc((u_k - u_{k'})T_p) \sum_m e^{i2\pi(u_k - u_{k'})\delta\tau_m} \right\}$$

From $$\frac{a_m}{c} \sin(\theta_r - \psi_m) = \delta\tau_m$$

the inner sum is $$\sum_m e^{i2\pi(u_k - u_{k'})\delta\tau_m} = \sum_m e^{i2\pi(u_k - u_{k'})\frac{a_m}{c}\sin(\theta_r - \psi_m)}.$$

For a football field size radar under consideration $\alpha_m \leq 300$ m and $|u_k - u_{k'}| \leq 100$ MHz, therefore, the argument of the exponential is bounded by $$|u_k - u_{k'}| \frac{a_m}{c} \leq 100 \text{ MHz} \frac{300 \text{ m}}{300 \text{ m}/\mu sec} = 100,$$

representing a large number of cycles. Therefore, it is expected that this sum will fluctuate near zero for all off-boresight target angles. This natural averaging of the unwanted terms is similar to the one in spread spectrum systems, the difference here being simultaneously averaged both in time and in space domains.

Receive Antenna Pattern

Next, is a discussion directed to calculating the full antenna pattern in receive mode. The field $E(\vec{R}(\tau',\theta),t)$ at an arbitrary nominal delay $\tau'$ and direction $\theta$ is reflected back to the $m^{th}$ antenna element where it is coherently correlated with the local reference $$V_m(t) = rect\left(\frac{t}{T_p}\right)\sum_k A_k e^{i2\pi u_k \delta\tau_{0m}} e^{i2\pi u_k t}.$$

The phase shifters are set to collimate in direction $\theta_r$, that is $$\delta\tau_{0m} = \frac{a_m}{c}\sin(\theta_r - \psi_m).$$

In an arbitrary direction $\theta \neq \theta_r$, though, $$\tau'_m \approx \tau' - \frac{a_m}{c}\sin(\theta - \psi_m) = \tau' - \delta\tau_m$$

with $$\delta\tau_m = \frac{a_m}{c}\sin(\theta - \psi_m),$$

and then (1.1)

$$E(\vec{R}(\tau',\theta),t) \propto rect\left(\frac{t-\tau'}{T_p}\right)\sum_k A_k e^{i\sigma_k} e^{i2\pi u_k(t-\tau')} e^{i2\pi u_k \frac{a_k}{c}\sin(\theta-\psi_k)}$$

from which the received wave at the $m^{th}$ antenna element is $$E_m(\vec{R},t) \propto E(\vec{R}, t - \tau'_m) \propto$$

$$rect\left(\frac{t - \tau' + \tau'_m}{T_p}\right)\sum_k A_k e^{i\sigma_k} e^{i2\pi u_k(t-\tau'-\tau'_m)} e^{i2\pi \frac{a_k}{\lambda_k}\sin(\theta-\psi_k)} \approx$$

$$rect\left(\frac{t - 2\tau' + \delta\tau'_m}{T_p}\right)\sum_k A_k e^{i\sigma_k} e^{i2\pi u_k(t-2\tau'+\delta\tau'_m)} e^{i2\pi \frac{a_k}{\lambda_k}\sin(\theta-\psi_k)} \approx$$

$$rect\left(\frac{t-\tau}{T_p}\right)\sum_k A_k e^{i\sigma_k} e^{i2\pi u_k(t-\tau+\delta\tau_m)} e^{i2\pi \frac{a_k}{\lambda_k}\sin(\theta-\psi_k)}$$

but since $\theta \neq \theta_r$, at no time is it expected that $E_m(\vec{R},t)$ be proportional to $V_m(t-\tau)$.

To simplify the formulas let:

$$\mu_k(\theta) = \sigma_k + 2\pi u_k \frac{a_k}{c}\sin(\theta - \psi_k) =$$

$$2\pi u_k \frac{a_k}{c}(\sin(\theta - \psi_k) - \sin(\theta_r - \psi_k)) = 2\pi u_k(\delta\tau_k - \delta\tau_{0k})$$

Then the cross-correlation of $$E_m(\vec{R},t) \propto rect\left(\frac{t-\tau}{T_p}\right)\sum_k A_k e^{i\mu_k} e^{i2\pi u_k(t-\tau'+\delta\tau'_m)}$$

with $V_m(t-\tau)$ is $$K_m(\vec{R},t) = \frac{1}{T_p}\int_{-\infty}^{\infty} E_m(\vec{R},t')\overline{V}_m(t-\tau'+t')dt' \propto$$

$$\frac{1}{T_p}\int_{-\infty}^{\infty} rect\frac{(t'-\tau)}{T_p}\sum_k A_k e^{i\mu_k} e^{i2\pi u_k(t'-\tau+\delta\tau'_m)} rect\left(\frac{t+t'-\tau}{T_p}\right)\sum_{k'} \overline{A}_{k'} e^{-i2\pi u_{k'}\delta\tau_{0m}} e^{-i2\pi u_{k'}(t+t'-\tau)}dt' =$$

$$\sum_k\sum_{k'} A_k e^{i\mu_k}\overline{A}_{k'} e^{-i2\pi(u_k-u_{k'})\tau} e^{i2\pi(u_k\delta\tau_{0m})}\frac{1}{T_p}\int_{\frac{T_p}{2}+\tau}^{\frac{T_p}{2}+\tau} rect\left(\frac{t+t'-\tau}{T_p}\right) e^{i2\pi u_k t'} e^{i2\pi u_{k'}(t+i')}dt'$$

When all the correlations from the individual receivers are combined coherently, the compressed signal is the sum of the correlations over all the antenna elements:

$$U(\vec{R},t) \propto tria\left(\frac{t}{T_p}\right)\sum_m\sum_k\sum_{k'} A_k\overline{A}_{k'} e^{i2\pi\left(u_k(\delta\tau_k-\delta\tau_{0k})-(u_k\delta\tau_m-u_{k'}\delta\tau_{0m})\right)} e^{-i\pi(u_k+u_{k'})t} e^{-i\pi(u_k+u_{k'})i} sinc((u_k-u_{k'})(T_p-|t|)) =$$

$$tria\left(\frac{t}{T_p}\right)\sum_k \left\{|A_k|^2 e^{i2\pi u_k(\delta\tau_k-\delta\tau_{0k})} e^{-i2\pi u_k t}\sum_m e^{-i2\pi u_k(\delta\tau_m-\delta\tau_{0m})}\right\} +$$

$$tria\left(\frac{t}{T_p}\right)\sum_{\substack{k,k' \\ k\neq k'}} \left\{A_k\overline{A}_{k'} e^{i2\pi u_k(\delta\tau_k-\delta\tau_{0k})} e^{i2\pi(u_k-u_{k'})\tau} e^{-i\pi u_k(u_k-u_{k'})i} sinc[(u_k-u_{k'})(T_p-|t|)]\sum_m e^{-i2\pi(u_k\delta\tau_m-u_k\delta\tau_{0m})}\right\}$$

If the terms $$\sum_m e^{-i2\pi(u_k\delta\tau_m-u_{k'}\delta\tau_{0m})}$$

and especially $$\sum_m e^{-i2\pi u_k(\delta\tau_m-u_k\delta\tau_{0m})}$$

are small, then the cross-correlation $U(\vec{R},t)$ will also be small. This can happen if $\theta$ differs from $\theta_r$ sufficiently enough so that $|u_k\delta\tau_m-u_k\delta\tau_{0m}|\gtrsim 1$, in which case the exponentials in the above sum will run over at least a full cycle thereby averaging the cross-correlation $U(\vec{R},t)$ to zero.

For the special case of uniformly spaced antenna elements on a flat surface, $\sin\psi_k=0$, $\alpha_k=kd$ and $$\sigma_k \equiv -2\pi\frac{kd}{\lambda_k}\sin\theta_r,$$

we can prove more. For then:

$$\delta\tau_{0m} = \frac{a_m}{c}\sin(\theta_r-\psi_m) = m\frac{d}{c}\sin(\theta_r),$$

$$\delta\tau_m = \frac{a_m}{c}\sin(\theta-\psi_m) = m\frac{d}{c}\sin(\theta)$$

and, thus, the antenna pattern factor can be calculated explicitly $$F_{kk'}(\theta) = q_{kk'}^{-M}\frac{\sin\left[M\frac{\pi d}{c}(u_k\sin(\theta)-u_{k'}\sin(\theta_r))\right]}{\sin\left[\frac{\pi d}{c}(u_k\sin(\theta)-u_{k'}\sin(\theta_r))\right]}, \quad (3.1)$$

where the unit phasor $q_{kk'}$ is defined by $$q_{kk'} = \exp\left[t\frac{\pi d}{c}(u_k\sin(\theta)-u_{k'}\sin(\theta_r))\right].$$

Thus, $$|F_{kk'}(\theta)|^2 = \left|\frac{\sin\left[M\frac{\pi d}{c}(u_k\sin(\theta) - u_{k'}\sin(\theta_r))\right]}{\sin\left[\frac{\pi d}{c}(u_k\sin(\theta) - u_{k'}\sin(\theta_r))\right]}\right|^2$$

and $$U(\vec{R}, t) \propto \qquad (3.2)$$

$$tri\left(\frac{t}{T_p}\right)\sum_k\sum_{k'}\left\{\begin{array}{l}F_{kk'}(\theta)\mathrm{sinc}[(u_k - u_{k'})(T_p - |t|A_k\overline{A}_{k'} \times \\ e^{i2\pi u_k(\delta\tau_k - \delta\tau_{0k})}e^{i2\pi u_k(\delta\tau_k - \delta_{k'})t}\end{array}\right\}$$

When all the frequencies are identical, $u_k = u_0 = c/\lambda_0$, then the array factor $$F_{kk'}(\theta) = F_\infty(\theta) = q_\infty^{-M}\frac{\sin\left[M\frac{\pi d}{\lambda_0}(\sin(\theta) - \sin(\theta_r))\right]}{\sin\left[\frac{\pi d}{\lambda_0}(\sin(\theta) - \sin(\theta_r))\right]}$$

is a common multiplier in all the summation terms with which the cross-correlation is also proportional, a standard result for the conventional radar.

Otherwise, the array factor $F_{kk'}(\theta)$ is not only a function of the beam steering angle $\theta$, but is also dependent on the frequency pair combinations $u_k$, $u_{k'}$. As can be seen from (3.2) every term is tapered by the array factor. In other words, each transmission amplitude $A_k$ is shaped by the antenna pattern corresponding to that frequency. Thus, the beam is realized as is required during reception.

Methods of Operation

Figure 7:
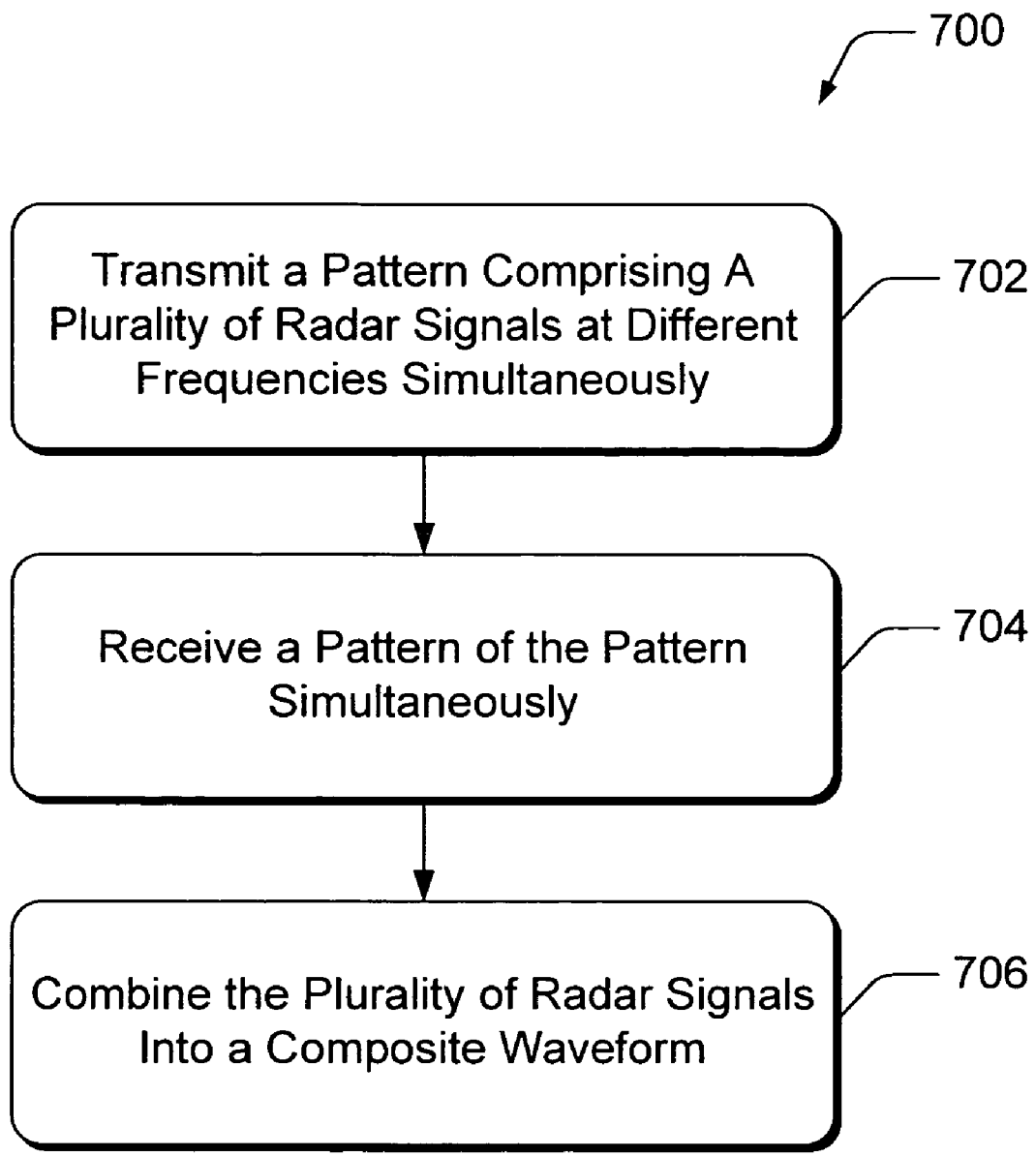
FIG. 7 is a flow chart illustrating an exemplary method of the present invention for transmitting and receiving radar signals from a radar system.

FIG. 7 is a flow chart illustrating an exemplary method 700 for transmitting and receiving radar signals from a radar system. Method 700 includes blocks 702, 704, and 706. The order in which the method is described is not intended to be construed as a limitation. Furthermore, the method 700 can be implemented in any suitable hardware, software, firmware, or combination thereof. In the exemplary implementation, method 700 is executed by antenna elements in conjunction with the exemplary components described above.

In block 702 a pattern of radar signals having different frequencies are transmitted, simultaneously. For example, a transmission unit 322 (FIG. 1) transmits the pattern 108 of radar signals $F_1, F_2, F_3, F_4, F_5, F_6, F_7, \ldots, F_N$ of different frequencies.

In block 704, the pattern is received after being reflected from a target. For example, a receiver system 106 (FIG. 1) receives a reflection of the pattern (i.e., see FIG. 1). A common reference oscillator signal (such as 301 shown in FIG. 3) is used to phase lock the transmission and reception of radar signals.

In block 706, the plurality of radar signals $F_1, F_2, F_3, F_4, F_5, F_6, F_7, \ldots, F_N$ having different frequencies are combined into a composite waveform to form an image of a target. For example, a processing system, such as one or more processors 304 and 316 (FIG. 3), combine the radar signals into a composite waveform.

SUMMARY

In summary, described herein is a novel concept of electronically scanned phase array (ESPA) radar whose operation employs a set of fully coherent oscillators that are individually phase locked to a common unmodulated reference oscillator but otherwise the oscillators may and will operate at different frequencies. In fact, each antenna array element is to transmit only a pure tone whose frequency varies from one radiating element to another and from pulse-to-pulse but receives the reflected composite aggregate of such tones. (This is a simplification but not necessary to the concept; there are other ways of decomposing a signal, e.g., orthogonal polynomials, etc.) The aggregate of these transmitted tones is to cover the full radar bandwidth the latter being commensurate with the specified range resolution.

In one implementation, a waveform may be designed to satisfy some required range resolution and dynamic range requirement. Then this waveform is decomposed into a convenient set of constituents, such as Fourier components. The latter having the advantage of possessing constant envelopes but others are possible, too. These constituents are transmitted in separate time epochs at the several radiators such a way that each radiator is to transmit the full set of constituents eventually.)

The reflected composite signal is phase-coherently demodulated, that is correlated, at each element and combined. This coherent correlation over the time and antenna angle variables will simultaneously compress the range and also form a synthetic spatially selective antenna beam. By properly adjusting the amplitudes and phases of the transmitted tones it is possible to shape and scan the antenna beam, respectively. Using the same amplitude and phase variables, each receiver element locally reconstructs a waveform that is expected at that particular element location and coherently adds the result of correlation to maximize the signal to noise ratio and minimize the antenna sidelobes.

The radar system described herein is, therefore, "spread spectrum" in both between time and frequency spectrum domains and between angle and wave vector spectrum domains. (The individual antenna elements are almost omnidirectional, i.e., wide spectrum in wave vector domain; in this sense this is synthetic aperture technique. At any given time, though, the elements radiate different waveforms, but they all receive coherently the same composite one.) By permuting the frequencies of the radiating elements from pulse-to-pulse, the off-boresight antenna pattern will strongly fluctuate, the waveform will scintillate, to combat jamming. Also, since beam forming happens at signal reception and not during transmission, the radar system has an inherently low probability of intercept.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A radar system, comprising:
   a transmission system, comprising a plurality of radiators, configured to transmit, simultaneously, a plurality of radar signals having different frequencies at a target and wherein each radiator is configured to transmit a radar signal that is unique with respect to other radar signals transmitted by other radiators of the plurality of radiators, and wherein the transmission system is further configured to permute the radar signals transmitted by each of the radiators over time; and a receiver system, comprising a plurality of radiators, configured to receive at least a portion of the plurality of radar signals being reflected from the target, and to combine the at least a portion of the plurality of radar signals into a composite waveform representing an image of the target.

2. The radar system as recited in claim 1, wherein the transmission system and the receiver system are phased-locked to a common reference oscillator signal.

3. A radar system, comprising:

a common reference oscillator signal;

a plurality of transmit/receive (T/R) elements phased locked to the common reference oscillator signal, each configured to simultaneously transmit a radar signal with a frequency that is unique to the particular T/R element and permuted over time, and simultaneously receive a conglomeration of the radar signals reflected from a target, including the radar signal with the frequency that is unique to the particular T/R element and permuted over time; and a processing system, configured to correlate each of the unique radar signals reflected from the target to each of the T/R elements that transmitted the radar signal, and based on the correlation, combine the radar signals to form an image of the target.

4. The radar system as recited in claim 3, further comprising a reference oscillator configured to generate the common reference oscillator signal.

5. The radar system as recited in claim 3, wherein each of the T/R elements includes a transmission unit and a receiver unit.

6. The radar system as recited in claim 3, wherein each of the T/R elements includes a transmission unit, a receiver unit, and a processing unit.

7. The radar system as recited in claim 3, wherein the processing system includes a plurality of processing units each corresponding to the plurality of T/R elements.

8. A method for transmitting and receiving radar signals, comprising:

transmitting a pattern comprising a plurality of unique radar signals having different, time permuted frequencies from a plurality of radiators simultaneously; and receiving a reflection of the pattern; and combining the plurality of unique radar signals having different, time permuted frequencies into a composite waveform to form an image of a target.

9. The method as recited in claim 8, wherein a transmission system transmits the pattern and a receiver system receives the reflection and combines the plurality of radar signals.

10. The method as recited in claim 8, further comprising generating a common reference oscillator signal.

11. The method as recited in claim 8, further comprising generating a common reference oscillator signal, and phase locking the plurality of radar signals when transmitting and combining the radar signals.

12. The method as recited in claim 8, further comprising transmitting a radar signal that is unique with respect to other radar signals.

13. A radar system, comprising:

means, having a plurality of transmit elements, for transmitting a pattern comprising a plurality of unique radar signals having different, time permuted frequencies simultaneously; and means having a plurality of receive elements for receiving a reflection of the pattern, and combining the plurality of unique radar signals having different, time permuted frequencies into a composite waveform to form an image of a target.

* * * * *